US007211725B1

(12) United States Patent
Tait

(10) Patent No.: US 7,211,725 B1
(45) Date of Patent: May 1, 2007

(54) WATERPROOF ELECTRICAL CONNECTION APPARATUS

(76) Inventor: Cameron Stuart Tait, P.O. Box 1285, Montauk, NY (US) 11959

( * ) Notice: Subject to any disclaimer, the term of this patent is extended or adjusted under 35 U.S.C. 154(b) by 332 days.

(21) Appl. No.: 10/355,874

(22) Filed: Feb. 3, 2003

(51) Int. Cl.
*H02G 3/14* (2006.01)

(52) U.S. Cl. ......................... 174/50; 220/4.02; 248/906

(58) Field of Classification Search ................... 174/50, 174/60, 65 R, 135; 220/4.02, 3.6, 3.8, 3.3; 248/906; 439/535
See application file for complete search history.

(56) References Cited

U.S. PATENT DOCUMENTS

| | | | |
|---|---|---|---|
| 3,573,714 A | | 4/1971 | Turner |
| 4,797,509 A | | 1/1989 | Cook |
| 4,917,625 A | | 4/1990 | Haile |
| 5,743,752 A | | 4/1998 | Massebeuf |
| 5,920,032 A | * | 7/1999 | Aeschbacher et al. ........ 174/47 |
| 5,980,278 A | | 11/1999 | Winkler |
| 6,518,500 B1 | * | 2/2003 | Huang ......................... 174/50 |
| 6,541,699 B1 | * | 4/2003 | Lindemulder et al. ........ 174/50 |
| 6,563,047 B2 | * | 5/2003 | Lambiaso .................... 174/50 |
| 6,563,048 B2 | * | 5/2003 | Holt et al. .................... 174/50 |

* cited by examiner

*Primary Examiner*—Dhiru R Patel
(74) *Attorney, Agent, or Firm*—Richard L. Mikesell

(57) ABSTRACT

The apparatus for conductively connecting a plurality of wires together in a waterproof manner includes a non-conductive connector housing having opposing ends. Wire guides are included at each end of the connector housing. A conductive pin is disposed within the housing, and typically supported within an internal wall. Opposing membranes disposed within the connector housing define a chamber which at least partially encases the electrical pin and contains a liquid sealant. Insertion of wires into the open ends of the connector housing and into contact with the pin punctures the membranes causing the liquid sealant to leak out and bond around the electrical wire and pin causing a conductive connection which is waterproof.

6 Claims, 1 Drawing Sheet

16
10
2
12
18
2
A
14

12
10
22
18

10
24
26
12
16
18
18
14
22
28

WATERPROOF ELECTRICAL CONNECTION APPARATUS

BACKGROUND OF THE INVENTION

The present invention generally relates to the connection of electrical wires and conductors. More particularly, the present invention relates to an apparatus for conductively connecting a plurality of wires together in a waterproof manner.

There are a variety of well-known electrical connectors, such as connector for splicing exposed ends of two electrical wires to one another to create a conductive connection therebetween. However, there are certain instances wherein a waterproof connection for such wires is needed. For example, in a marine environment it would be useful to have an electrical connecting apparatus which creates a waterproof connection between two or more wires in order to prevent the wires from becoming shorted or corroded due to the exposure of water in such environments.

Accordingly, there is a continuing need for an apparatus for conductively connecting electrical wires together in a waterproof manner. The present invention fulfills this need and provides other related advantages.

SUMMARY OF THE INVENTION

The present invention resides in an apparatus for conductively connecting two or more electrical wires together in a waterproof manner. The apparatus comprises a non-conductive connector housing having opposing ends. Preferably, the connector housing includes electrical wire guides. Such wire guides may comprise a plurality of barbs extending inwardly into the connector from the ends thereof.

A conductive pin is disposed within the housing, typically supported by a central wall thereof. Membranes are disposed within the connector housing to define a chamber which at least partially encases the electrical pin. The chamber contains a liquid sealant, whereby insertion of an electrical wire into an open end of the connector housing and into contact with the pin punctures the membrane causing the liquid sealant to bond around the electrical wire and pin. By inserting two or more wires into the opposing ends of the connector housing, a waterproof and conductive connection is created between the wires.

Other features and advantages of the present invention will become apparent from the following more detailed description, taken in conjunction with the accompanying drawings, which illustrate, by way of example, the principles of the invention

BRIEF DESCRIPTION OF THE DRAWINGS

The accompanying drawings illustrate the invention. In such drawings.

DETAILED DESCRIPTION OF THE PREFERRED EMBODIMENT

Figure 1:
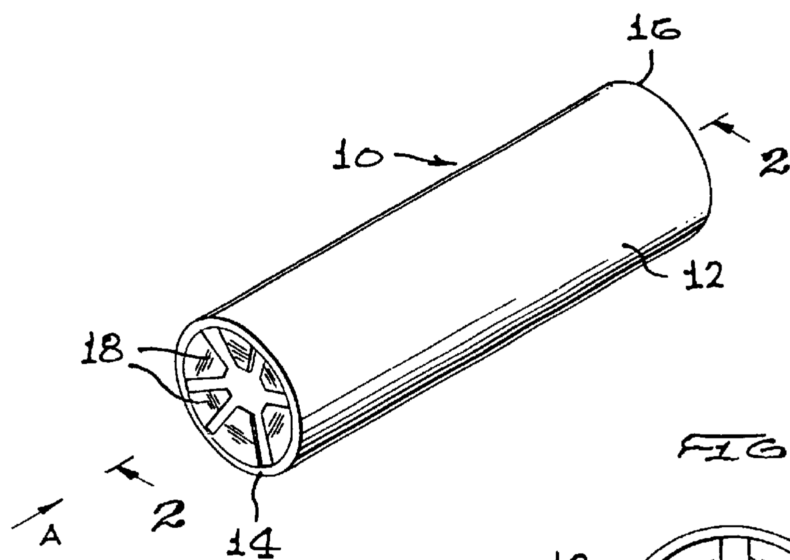
FIG. 1 is a perspective view of a waterproof electrical connection apparatus embodying the present invention.

As shown in the drawings for purposes of illustration, the present invention resides in a waterproof electrical wire connection apparatus, generally referred to by the reference number 10. The apparatus 10 is intended to conductively connect a plurality of wires together in a waterproof manner.

Figure 3:
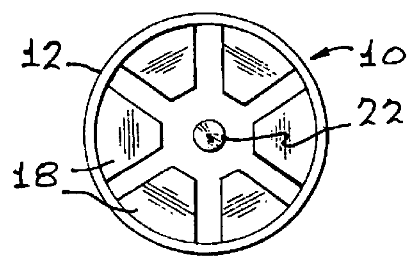
FIG. 3 is an end elevational view taken generally along line “A”, illustrating an electrical wire guide thereof.
Figure 2:
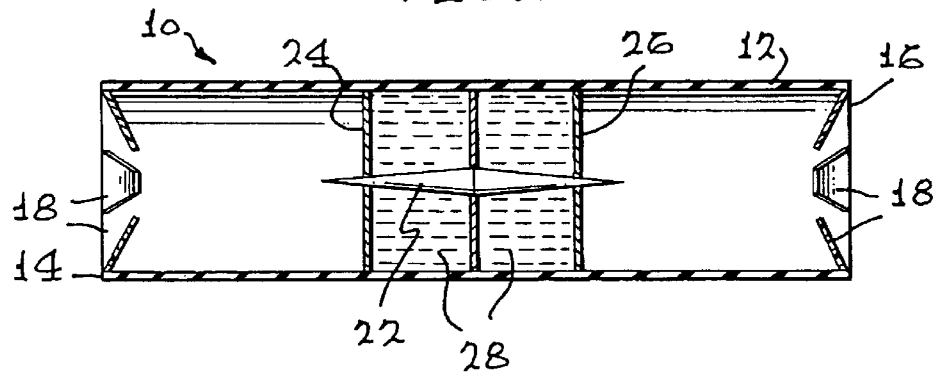
FIG. 2 is a cross-sectional view taken generally along line 2—2 of FIG. 1, illustrating the various component parts thereof.

With reference to FIGS. 1–3, the apparatus 10 includes a non-connective conductor housing 12 which is typically cylindrical in configuration. The housing 12 includes opposing ends 14 and 16 sized to receive one or more wires therein. Preferably, each open end 14 and 16 includes a wire guide therein. The wire guide, as illustrated, may comprise a plurality of inwardly directed barbs 18 preferably comprised of an insulative material. As shown, the barbs 18 are directed inwardly from the open ends 14 and 16 so as to extend towards a central longitudinal axis of the housing 12. Thus, a wire which is to be inserted is guided into a central portion of the housing 12, and the barbs 18 can further resist the removable of such a wire or wires from the housing 12.

A central wall 20 supports a pin 22 having sharpened ends. Thin walls or membranes 24 and 26 are formed within the housing 12 so as to at least partially encase the pin 22. The area between the membranes 24 and 26 defines a chamber which contains a liquid sealant. The liquid sealant is preferably injected into the chamber 28 during the manufacturing of the apparatus 10. However, an injection port may be included in the housing 12 so as to inject such a liquid sealant before use.

In use, one or more wires are inserted through the barbs 18 and into contact with the pin 22. This causes the membrane 24 or 26 to rupture, and the liquid sealant within the chamber 28 to flow out and onto the exposed ends of the wires (not shown) and the pin 22. The liquid sealant is air-activated so as to bond and solidify around the electrical wire and pin 22. It will be appreciated that the electrical wire does not need to be trimmed, so long as a wire cord thereof is exposed and capable of being pushed onto the sharpened end of pin 22. After the liquid sealant cures, a waterproof electrical connection is made between the wire or wires and the pin 22 within the apparatus 10. By inserting wires through both open ends 14 and 16 of the apparatus 10, an electrical connection is made therebetween through pin 22, which is waterproof due to the solidification of the liquid sealant.

Although several embodiments have been described in some detail for purposes of illustration, various modifications may be made without departing from the scope and spirit of the invention. Accordingly, the invention is not to be limited, except as by the appended claims.

What is claimed is:

1. An apparatus for conductively connecting a plurality of wires together in a waterproof manner, the apparatus comprising:

a non-conductive connector housing having opposing open ends;

a conductive pin disposed within the housing; and opposing membranes disposed within the connector housing and defining a chamber at least partially encasing the pin and containing a liquid sealant, whereby insertion of a wire into an open end of the connector housing and into contact with the pin punctures the membrane causing the liquid sealant to bond around the wire and pin.

2. The apparatus of claim 1, wherein the pin is supported by an internal wall of the connector housing.

3. The apparatus of claim 1, including wire guides at each end of the connector housing.

4. The apparatus of claim 3, wherein the wire guides comprise a plurality of inwardly directed barbs.

5. The apparatus of claim 1, wherein the liquid sealant is air-activated.

6. An apparatus for conductively connecting a plurality of wires together in a waterproof manner, the apparatus comprising:

a non-conductive connector housing having opposing open ends;

wire guides comprised of a plurality of barbs extending inwardly into the connector housing from ends thereof;

a wall disposed within the connector housing and supporting a conductive pin; and opposing membranes disposed within the connector housing and defining a chamber at least partially encasing the pin and containing an air-activated liquid sealant, whereby insertion of a wire into an open end of the connector housing and into contact with the pin punctures the membrane causing the liquid sealant to bond around the wire and pin.

* * * * *